(12) United States Patent
Endo et al.

(10) Patent No.: US 8,136,205 B2
(45) Date of Patent: Mar. 20, 2012

(54) BIAXIAL HINGE DEVICE AND MOBILE TERMINAL DEVICE

(75) Inventors: Isao Endo, Kanagawa (JP); Tsutomu Takahashi, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 422 days.

(21) Appl. No.: 12/406,182

(22) Filed: Mar. 18, 2009

(65) Prior Publication Data
US 2009/0235487 A1    Sep. 24, 2009

(30) Foreign Application Priority Data
Mar. 19, 2008    (JP) ................ P2008-072322

(51) Int. Cl.
*E05D 3/10*    (2006.01)
(52) U.S. Cl. .................................. 16/367
(58) Field of Classification Search ............... 16/367, 16/386, 338–340, 330, 303, 380; 361/679.06, 361/679.27, 679.28, 679.11, 679.12, 679.13; 379/433.12, 433.13; 455/575.1, 575.4, 575.8, 455/550.1, 90.3; 348/373, 333.06, 794; 248/291.1, 248/292.12, 292.13, 919–923
See application file for complete search history.

(56) References Cited

U.S. PATENT DOCUMENTS

| | | | | |
|---|---|---|---|---|
| 7,299,526 B2 * | 11/2007 | Kim | ................. | 16/367 |
| 7,380,313 B2 * | 6/2008 | Akiyama et al. | ................ | 16/367 |
| 7,532,459 B2 * | 5/2009 | Son et al. | ................ | 361/679.56 |
| 7,533,449 B2 * | 5/2009 | Hsu | ................. | 16/367 |
| 7,574,774 B2 * | 8/2009 | Chang et al. | .................... | 16/367 |
| 7,610,658 B2 * | 11/2009 | Lee et al. | ......................... | 16/367 |
| 7,797,797 B2 * | 9/2010 | Chiang et al. | .................. | 16/367 |
| 2005/0283949 A1 * | 12/2005 | Lu et al. | ........................ | 16/367 |
| 2007/0037616 A1 | 2/2007 | Hung | | |
| 2007/0174997 A1 * | 8/2007 | Lu et al. | ......................... | 16/367 |
| 2008/0078060 A1 * | 4/2008 | Chen | .............................. | 16/367 |
| 2008/0204985 A1 * | 8/2008 | Bae et al. | ..................... | 361/681 |

FOREIGN PATENT DOCUMENTS

| | | | |
|---|---|---|---|
| EP | 1 764 672 | | 3/2007 |
| EP | 1 791 330 | | 5/2007 |
| JP | 2001227229 A | * | 8/2001 |
| JP | 2005 198062 | | 7/2005 |

* cited by examiner

*Primary Examiner* — Chuck Y. Mah
(74) *Attorney, Agent, or Firm* — Frommer Lawrence & Haug LLP; William S. Frommer; Paul A. Levy

(57) ABSTRACT

A biaxial hinge device includes: a first rotation axis mechanism configured to form a first rotation axis by using a substantially cylindrically shaped first shaft member; a first arm portion configured to include a fixing portion fixed to a first case, and provided to the first shaft member of the first rotation axis mechanism; a second rotation axis mechanism configured to include a fixing portion fixed to a second case, and to form a second rotation axis substantially perpendicular to the first rotation axis by using a substantially cylindrically shaped second shaft member; and a second arm portion configured to connect the first rotation axis mechanism to the second rotation axis mechanism such that the first rotation axis mechanism is rotatable around the second rotation axis of the second rotation axis mechanism.

4 Claims, 11 Drawing Sheets

BIAXIAL HINGE DEVICE AND MOBILE TERMINAL DEVICE

CROSS REFERENCES TO RELATED APPLICATIONS

The present invention contains subject matter related to Japanese Patent Application JP 2008-072322 filed in the Japanese Patent Office on Mar. 19, 2008, the entire contents of which are incorporated herein by reference.

BACKGROUND OF THE INVENTION

1. Field of the Invention

The present invention relates to a biaxial hinge device and a mobile terminal device suitable to be applied to a mobile phone, a PHS (Personal Handyphone System) phone, a PDA (Personal Digital Assistant) device, a mobile game device, a notebook personal computer device, and so forth, which include a hinge unit enabling such operations as opening and closing of a case, for example. The present invention particularly relates to a biaxial hinge device having two rotation axes and a mobile terminal device, in which a space occupied by biasing members for biasing cam members used to regulate the rotation of the respective rotation axes is reduced to reduce the size of the biaxial hinge device, and in which a space for accommodating a harness or a flexible board for electrically connecting an electrical component provided to an upper case and an electrical component provided to a lower case can be eliminated to reduce the size of the hinge device.

2. Description of the Related Art

Japanese Unexamined Patent Application Publication No. 2005-198062 (pages 8 to 9 and FIG. 5, Patent Document 1) discloses a folding mobile phone having three functions, i.e., a function of opening and closing in a longer direction of an upper case, a function of opening and closing in a shorter direction of the upper case, and a function of folding with the upper case turned inside out.

The folding mobile phone includes a hinge unit configured to be divided into a first hinge unit and a second hinge unit. The first hinge unit includes a first rotating shaft for supporting the first hinge unit to be rotatable with respect to a lower case, and a second rotating shaft for supporting the second hinge unit to be rotatable with respect to the first hinge unit. The first rotating shaft and the second rotating shaft are provided to be perpendicular to each other. The second hinge unit includes a third rotating shaft for supporting the upper case to be rotatable with respect to the second hinge unit. The third rotating shaft is provided to be perpendicular to the second rotating shaft. With this configuration, the upper case can be rotated around the respective directions of three rotating shafts, i.e., the first rotating shaft, the second rotating shaft, and the third rotating shaft.

SUMMARY OF THE INVENTION

However, in a hinge device including a plurality of mutually perpendicular rotation axes, such as the above-described hinge unit provided to the folding mobile phone disclosed in Patent Document 1, springs for pressing rotation regulating cams are provided along the respective rotation axes. That is, in a biaxial hinge device enabling longitudinal opening and lateral opening of a case, a spring for regulating the longitudinal opening is provided along the rotation axis for the longitudinal opening to press a cam for regulating the longitudinal opening. Further, a spring for regulating the lateral opening is provided along the rotation axis for the lateral opening to press a cam for regulating the lateral opening.

This naturally means that a space for installing the plurality of springs is included in the hinge device, and the space increases the size of the hinge device. As a result, there arises an issue of hindrance to size reduction of a device provided with the hinge device.

Further, in the folding mobile phone, an electrical component such as a liquid crystal display unit provided in the upper case and an electrical component such as a circuit board provided in the lower case are electrically connected. Thus, a harness or a flexible board for connecting the electrical components of both cases is provided through the hinge device. This means that a space for accommodating the harness or the flexible board is included in the hinge device, and the inclusion of the space leads to an issue of an increase in the size of the hinge device. The increase in the size of the hinge device results in substantial projection of the hinge device from the cases. As a result, the hinge device may cause radio interference.

The present invention has been made in light of the above-described issues. It is desirable to provide a biaxial hinge device having two axes for longitudinal rotation and lateral rotation, respectively, and a mobile terminal device, in which a space occupied by biasing members for biasing cam members used to regulate the rotation of the respective rotation axes is reduced to reduce the size of the biaxial hinge device, and in which a space for accommodating a harness or a flexible board for electrically connecting an electrical component provided to an upper case and an electrical component provided to a lower case can be eliminated to reduce the size of the hinge device, to thereby prevent inconvenience of radio interference and so forth caused by an increase in the size of the hinge device.

In view of the above-described issues, a biaxial hinge device according to an embodiment of the present invention includes: a first rotation axis mechanism configured to form a first rotation axis by using a substantially cylindrically shaped first shaft member; a first arm portion configured to include a fixing portion fixed to a first case, and provided to the first shaft member of the first rotation axis mechanism; a second rotation axis mechanism configured to include a fixing portion fixed to a second case, and to form a second rotation axis substantially perpendicular to the first rotation axis by using a substantially cylindrically shaped second shaft member; and a second arm portion configured to connect the first rotation axis mechanism to the second rotation axis mechanism such that the first rotation axis mechanism is rotatable around the second rotation axis of the second rotation axis mechanism.

Further, in a mobile terminal device according to an embodiment of the present invention, a first case and a second case are connected to each other to be longitudinally and laterally openable via a biaxial hinge device having mutually substantially perpendicular rotation axes. In view of the above-described issues, the mobile terminal device includes the biaxial hinge device which includes: a first rotation axis mechanism configured to form a first rotation axis by using a substantially cylindrically shaped first shaft member; a first arm portion configured to include a fixing portion fixed to the first case, and provided to the first shaft member of the first rotation axis mechanism; a second rotation axis mechanism configured to include a fixing portion fixed to the second case, and to form a second rotation axis substantially perpendicular to the first rotation axis by using a substantially cylindrically shaped second shaft member; and a second arm portion configured to connect the first rotation axis mechanism to the second rotation axis mechanism such that the first rotation axis mechanism is rotatable around the second rotation axis of the second rotation axis mechanism.

In the above-described embodiments of the present invention, each of the first shaft member provided to the first rotation axis mechanism and the second shaft member provided to the second rotation axis mechanism has a substantially cylindrical shape. Thus, a cable, a flexible board, or the like can be provided through respective inner holes of the first shaft member and the second shaft member. Therefore, it is unnecessary to provide a space for wiring the cable or the like in the biaxial hinge device. Accordingly, the wiring space can be eliminated, and thus the biaxial hinge device can be reduced in size.

Further, the biaxial hinge device according to the embodiment of the present invention may further include a first cam member configured to come into contact with the second arm portion to regulate the rotational position of the first arm portion, first biasing means for biasing the first cam member such that the first cam member comes into contact with the second arm portion, a second cam member configured to come into contact with the second arm portion to regulate the rotational position of the second arm portion, and second biasing means for biasing the second cam member such that the second cam member comes into contact with the second arm portion. Further, at least the second biasing means may include a disc spring. This configuration addresses the above-described issues.

As compared with a configuration using a spring as a biasing member, the above-described embodiment of the present invention can substantially reduce the space occupied by the biasing member. Due to the reduction of the space, therefore, the biaxial hinge device can be reduced in size.

According to the embodiments of the present invention, each of the first shaft member provided to the first rotation axis mechanism and the second shaft member provided to the second rotation axis mechanism has a substantially cylindrical shape. Thus, a cable, a flexible board, or the like can be provided through respective internal holes of the first shaft member and the second shaft member. Therefore, it is unnecessary to provide a space for wiring the cable or the like in the biaxial hinge device. Accordingly, the wiring space can be eliminated, and thus the biaxial hinge device can be reduced in size.

Further, the embodiments of the present invention may use a disc spring as biasing means for biasing a cam member which regulates a rotational position. Therefore, as compared with a configuration using a spring as a biasing member, the embodiments of the present invention can substantially reduce the space occupied by the biasing member. Due to the substantial reduction of the space occupied by the biasing member, therefore, the biaxial hinge device can be reduced in size.

DESCRIPTION OF THE PREFERRED EMBODIMENTS

The present invention can be applied to a folding mobile phone capable of longitudinally and laterally opening a case thereof.

Figure 1:
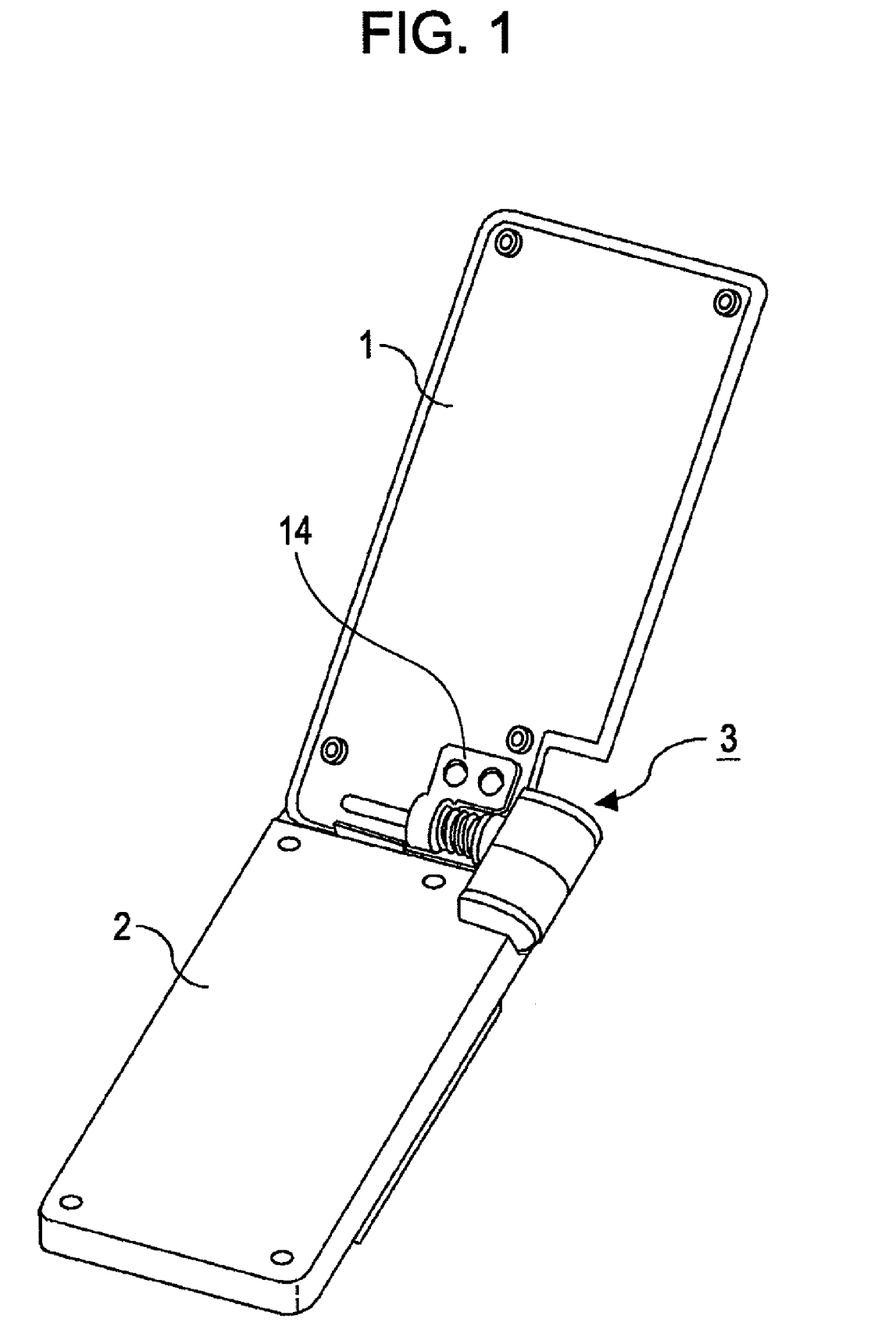
FIG. 1 is a perspective view of a mobile phone according to an embodiment of the present invention in a longitudinally opened state.
Figure 2:
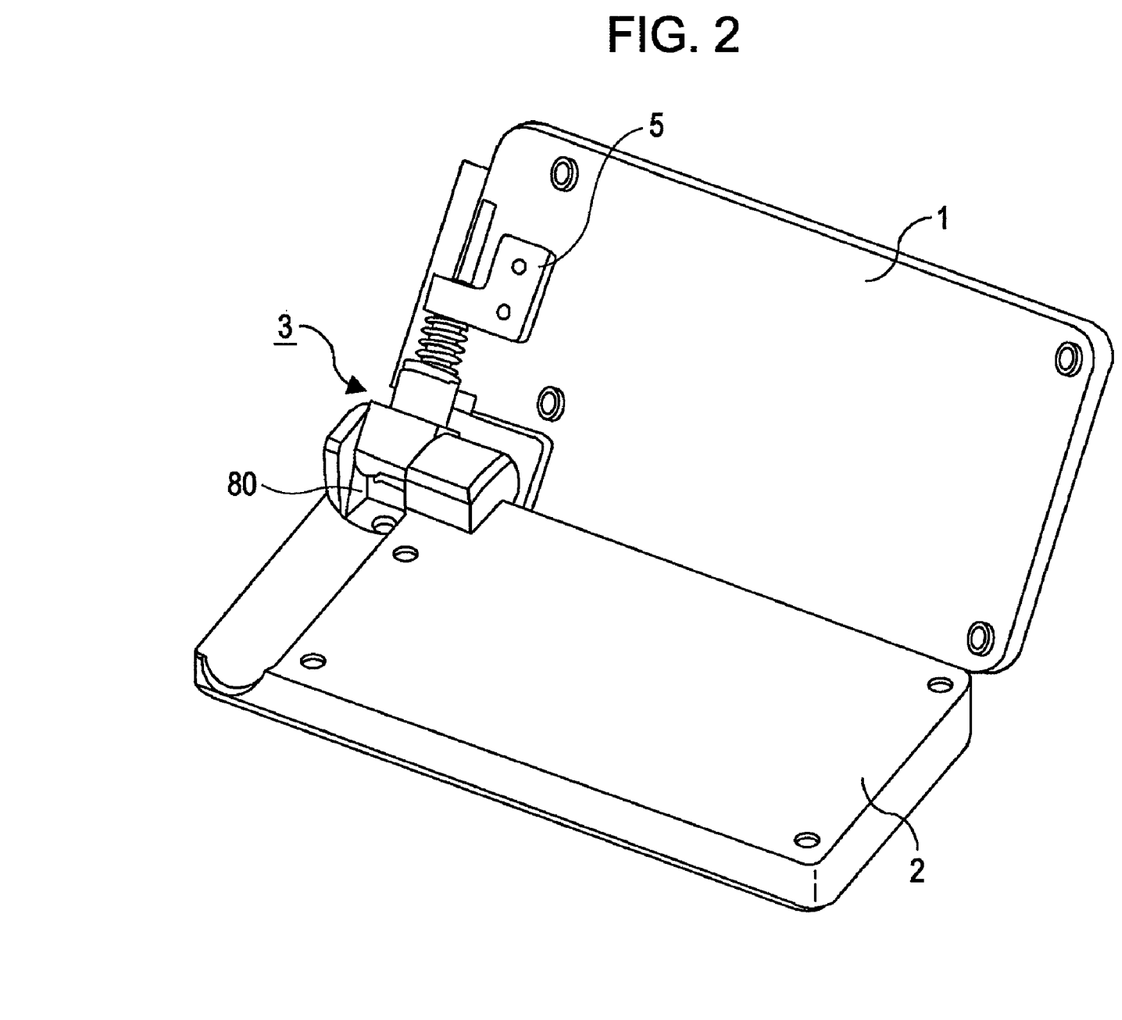
FIG. 2 is a perspective view of the mobile phone according to the embodiment in a laterally opened state.

Configuration of Mobile Phone: FIG. 1 illustrates a perspective view of a mobile phone according to an embodiment of the present invention in a longitudinally opened state. FIG. 2 illustrates a perspective view of the mobile phone according to the embodiment in a laterally opened state. As illustrated in these FIGS. 1 and 2, the mobile phone according to the embodiment includes an upper case 1, a lower case 2, and a biaxial hinge unit 3. The upper case 1 is provided with a display unit, such as a liquid crystal display unit and an organic EL (Electro Luminescence) display unit. The lower case 2 is provided with an operation unit, which includes rotational operation keys, numeric keys, and so forth. The biaxial hinge unit 3 is capable of closing and opening the upper case 1 and the lower case 2 in a longitudinal direction (i.e., the longitudinally opened state) and a lateral direction (i.e., the laterally opened state) around respective rotation axes substantially perpendicular to each other.

Figure 3:
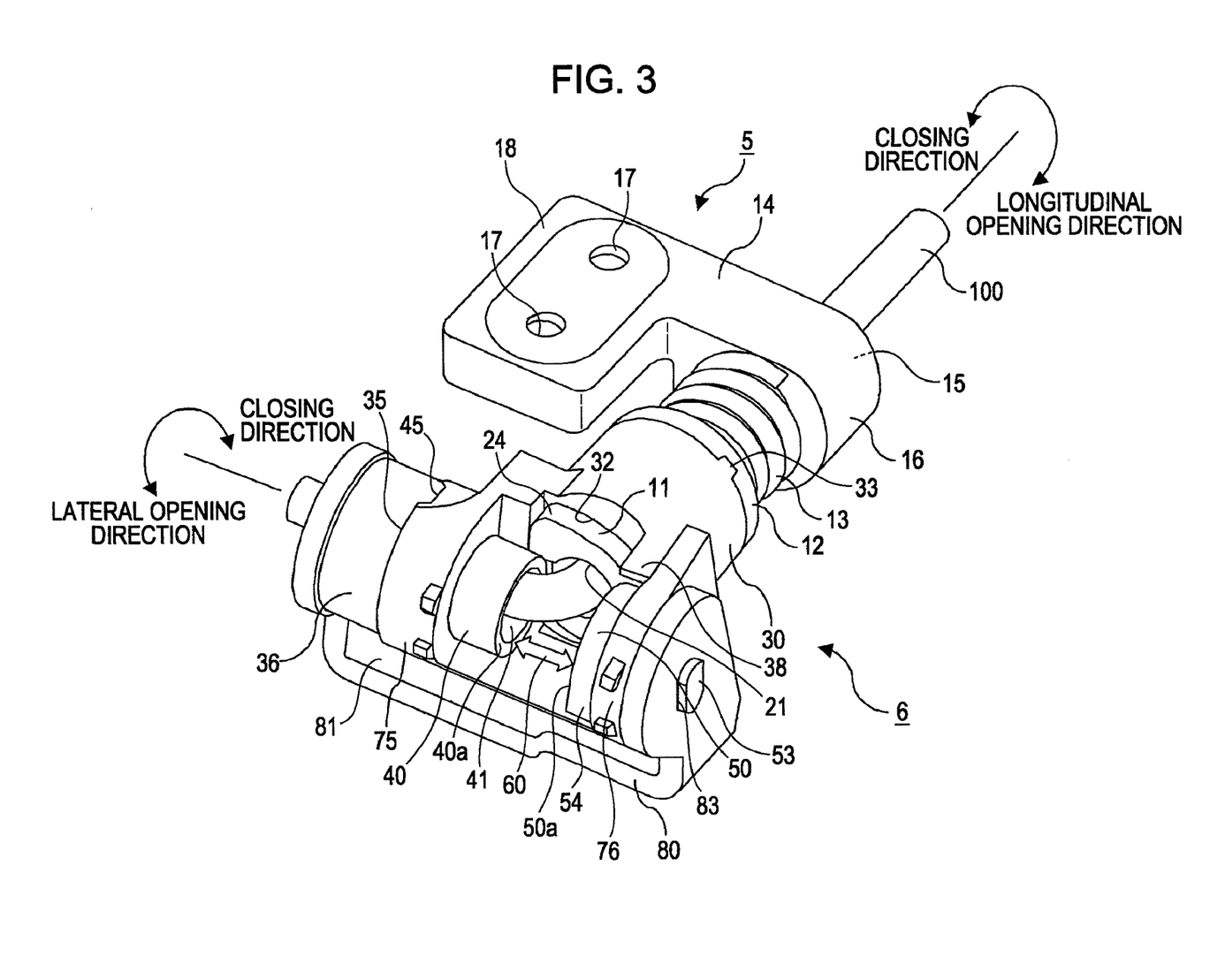
FIG. 3 is a perspective view of a biaxial hinge unit provided to the mobile phone according to the embodiment.

Configuration of Biaxial Hinge Unit: As illustrated in FIG. 3, the biaxial hinge unit 3 is formed by a longitudinal opening mechanism 5 which enables longitudinal opening of the upper case 1 and the lower case 2, and a lateral opening mechanism 6 which enables lateral opening of the upper case 1 and the lower case 2. The longitudinal opening mechanism 5 and the lateral opening mechanism 6 are connected such that the respective rotation axes thereof are substantially perpendicular to each other (connected to form a substantially T-shape).

Configuration of Longitudinal Opening Mechanism: The longitudinal opening mechanism 5 includes a first shaft member 11 functioning as a rotation axis (a longitudinal rotation axis) when the mobile phone is brought into the longitudinally opened state as illustrated in FIG. 1, a disc-like first cam member 12, a spring 13 for biasing the disc-like first cam member 12, and a first arm portion 14 fixed to the upper case 1 by screws or the like.

Figure 4:
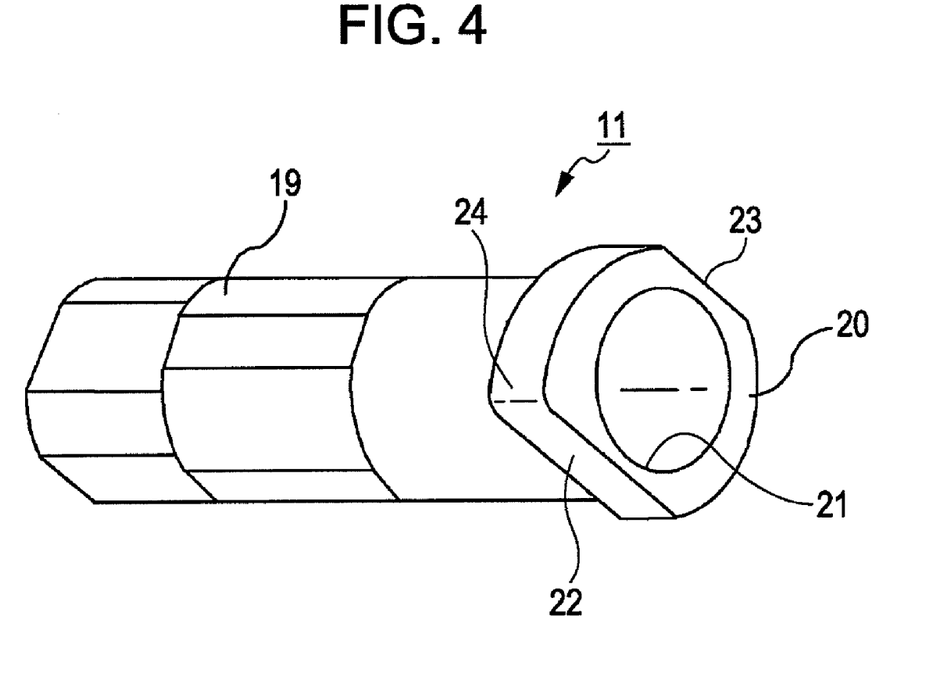
FIG. 4 is a perspective view of a first shaft member provided to the biaxial hinge unit.

As illustrated in FIG. 4, the first shaft member 11 is formed such that a shaft body 19 has a substantially cylindrical shape, and that a rotation regulating member 20 is provided at one end portion of the first shaft member 11 to regulate the rotation angle in the longitudinal opening operation and regulate the rotation in the longitudinal opening direction of the upper case 1 in the lateral opening operation. The shaft body 19 and the rotation regulating member 20 are provided with a cable insertion hole 21 passing therethrough. As described later, a cable, a flexible board, or the like can be provided in the first shaft member 11 through the cable insertion hole 21.

Respective portions of the shaft body 19 provided with the later-described first cam member 12 and the first arm portion 14 are so-called D-cut (or polygon-shaped) such that cross sections of the respective portions obtained by cutting the shaft body 19 along the radial direction have a substantially D-shape.

The rotation regulating member 20 is substantially doughnut-shaped, with the center thereof provided with the cable insertion hole 21 having a diameter substantially equal to the diameter of the hole provided in the shaft body 19. Further, right and left end portions of the rotation regulating member 20 are cut off along the thickness direction, and respective surface portions obtained by the cutting-off form a first contact surface portion 22 and a second contact surface portion 23. In the laterally opened state of the mobile phone, the first contact surface portion 22 comes into contact with an end portion 40a of a second shaft member 40 illustrated in FIG. 3. Further, in the laterally opened state of the mobile phone, the second contact surface portion 23 comes into contact with an end portion 50a of a third shaft member 50 illustrated in FIG. 3.

That is, the right and left end portions of the rotation regulating member 20 are cut off along the thickness direction such that, in the laterally opened state of the mobile phone, the width of the rotation regulating member 20 is substantially equal to the width of a gap 60 illustrated in FIG. 3, which is formed between the end portion 40a of the second shaft member 40 and the end portion 50a of the third shaft member 50.

Figure 13:
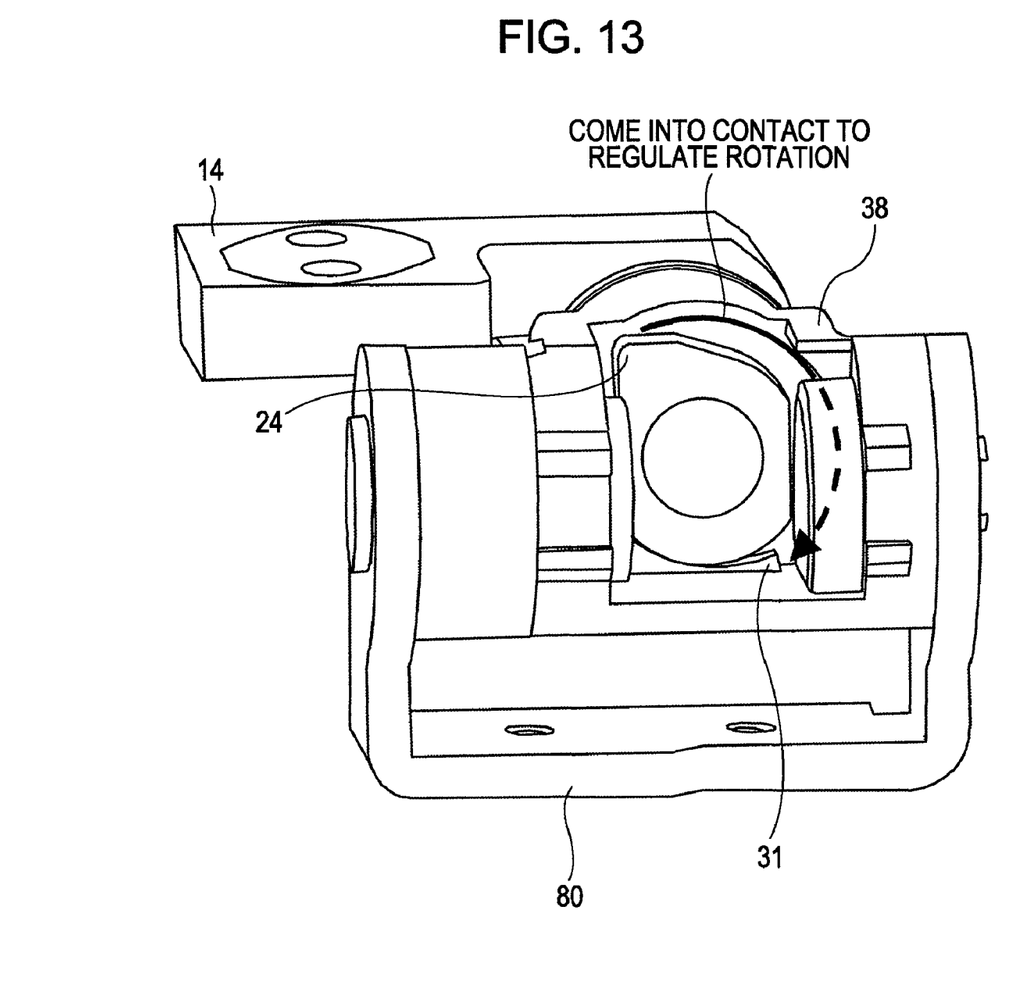
FIG. 13 is a diagram for explaining the regulation of a rotation angle performed in longitudinal opening of the biaxial hinge unit.

Further, as illustrated in FIG. 4, the rotation regulating member 20 is provided with a projecting portion 24 projecting from one end portion of the first contact surface portion 22 in a direction substantially perpendicular to a longer direction of the first shaft member 11. In the longitudinally opened state of the mobile phone, the projecting portion 24 comes into contact with a stopper 31 provided to a second arm portion 30 illustrated in FIG. 13, to thereby regulate the angle formed in the longitudinally opened state of the mobile phone to a predetermined angle.

Figure 5:
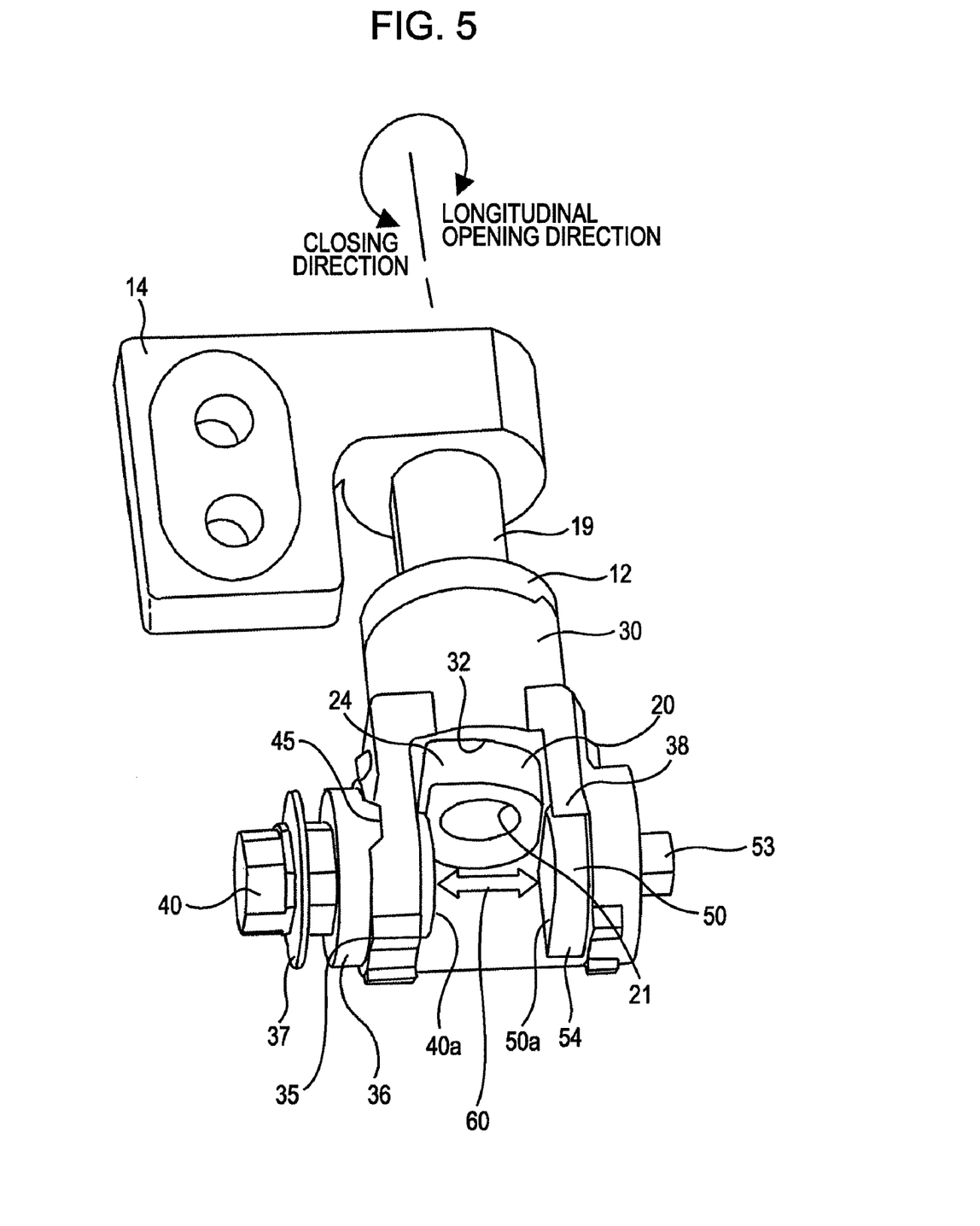
FIG. 5 is a perspective view of main parts of the biaxial hinge unit.

As illustrated in FIGS. 3 and 5, the above-described first shaft member 11 is provided with the shaft body 19 inserted into a shaft insertion hole 32 of the second arm portion 30 such that the rotation regulating member 20 is located on the side of the second arm portion 30.

With the first shaft member 11 thus provided to the second arm portion 30, the longitudinal opening mechanism 5 is formed such that the shaft body 19 of the first shaft member 11 is inserted through the first cam member 12, the spring 13, and the first arm portion 14, and that the other end portion of the first shaft member 11 (i.e., an end portion opposite to the end portion provided with the rotation regulating member 20) is provided with a washer stopper. Thereby, the first cam member 12, the spring 13, and the first arm portion 14 are prevented from dropping off from the shaft body 19.

Figure 6:
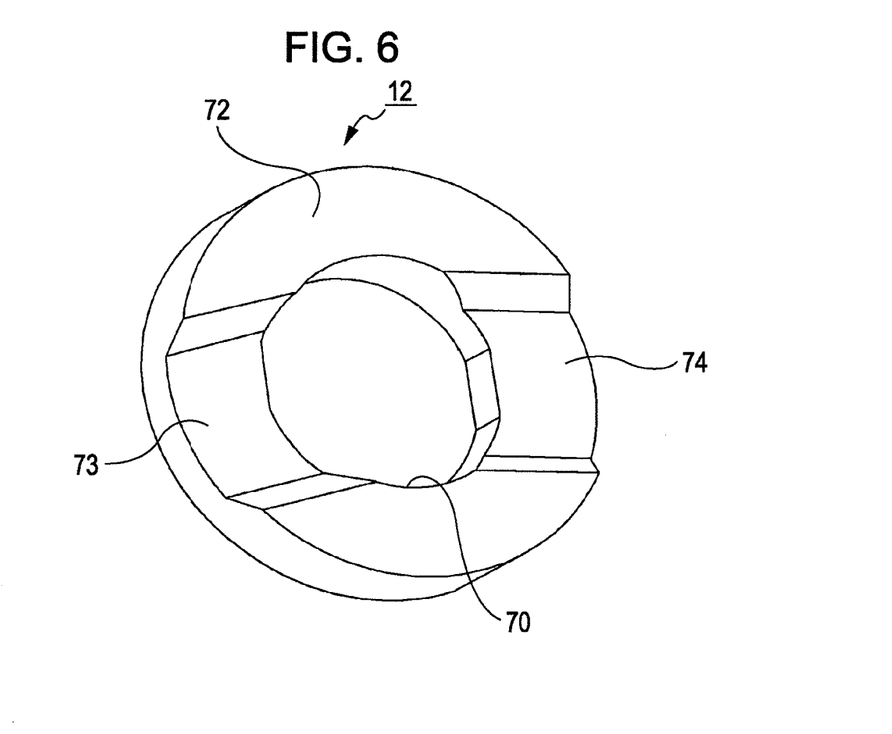
FIG. 6 is a perspective view of a first cam member provided to the biaxial hinge unit.

FIG. 6 is a perspective view of the first cam member 12, through which the first shaft member 11 is inserted. As seen from FIG. 6, the overall shape of the first cam member 12 is a doughnut shape, and the first cam member 12 includes a shaft insertion hole 70 through which the shaft body 19 of the first shaft member 11 is inserted. The shaft insertion hole 70 forms a substantially D-shaped hole. Thus, when the shaft body 19 is inserted into the shaft insertion hole 70, the D-cut portion of the shaft body 19 fits into the shaft insertion hole 70. Therefore, the first cam member 12 is rotated in accordance with the rotation of the first shaft member 11.

Further, a surface of the first cam member 12 is provided with two concave portions 73 and 74 across the shaft insertion hole 70. In the closed state of the mobile phone, the concave portion 73 fits with a convex portion 33 provided to the second arm portion 30 illustrated in FIG. 3. Further, when the rotation angle of the mobile phone in the longitudinal opening operation reaches a preset predetermined rotation angle, e.g., 170 degrees, the concave portion 74 fits with the convex portion 33 provided to the second arm portion 30 illustrated in FIG. 3. Further, respective end portions in the circumferential direction of the concave portions 73 and 74 are tapered to form gradual slopes from the concave portions 73 and 74 to a cam surface 72. The spring 13 biases the thus configured first cam member 12 in the direction of the second arm portion 30.

The first arm portion 14 includes an arm fixing portion 16 provided with a shaft insertion hole 15 through which the first shaft member 11 is inserted, and a case fixing portion 18 provided with screw holes 17 through which the first arm portion 14 is screwed onto the upper case 1. The shaft insertion hole 15 forms a substantially D-shaped hole. Thus, when the shaft body 19 is inserted into the shaft insertion hole 15, the D-cut portion of the shaft body 19 fits into the shaft insertion hole 15. Therefore, when the upper case 1 is rotated, the first arm portion 14 fixed to the upper case 1 is rotated, and the first shaft member 11 is rotated in accordance with the rotation of the first arm portion 14. That is, when a user performs a rotating operation of the upper case 1, the force applied to the upper case 1 by the user in the rotating operation is transmitted to the first shaft member 11 via the first arm portion 14. Thereby, the first arm portion 14 and the first shaft member 11 are rotated in accordance with the rotating operation of the upper case 1.

Configuration of Lateral Opening Mechanism: As illustrated in FIG. 3, the lateral opening mechanism 6 includes the second and third shaft members 40 and 50, a housing 80, and the second arm portion 30. The second and third shaft members 40 and 50 function as a rotation axis (a lateral rotation axis) in the laterally opened state (see FIG. 2) of the mobile phone. The housing 80, which includes a fixing portion 81 fixed to the lower case 2 of the mobile phone by screws or the like, rotatably supports the second and third shaft members 40 and 50 such that the second and third shaft members 40 and 50 form the lateral rotation axis. The second arm portion 30 is supported by the second and third shaft members 40 and 50 and the housing 80 to rotate around the lateral rotation axis.

As illustrated in FIGS. 3 and 5, the lateral opening mechanism 6 further includes a second cam member 36 which is brought into contact with a cam surface 35 of the second arm portion 30, and disc springs 37 which bias the second cam member 36 toward the cam surface 35 of the second arm portion 30. FIG. 5 only illustrates a single disc spring 37. However, it is desired to be understood that a plurality, e.g., three, of the disc springs 37 are actually provided.

Figure 7:
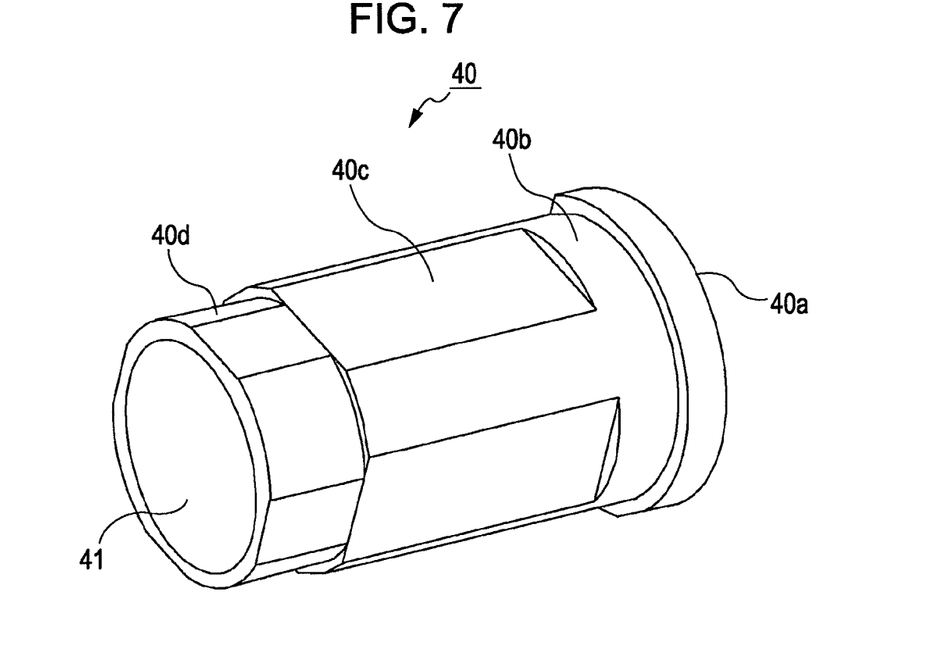
FIG. 7 is a perspective view of a second shaft member provided to the biaxial hinge unit.

As illustrated in FIG. 7, the second shaft member 40 has a substantially cylindrical shape provided with a cable insertion hole 41 extending along a longer direction thereof. As described later, a cable, a flexible board, or the like can be provided in the second shaft member 40 through the cable insertion hole 41.

An outer circumferential portion of the second shaft member 40 includes a first outer circumferential portion 40b over which a first rotation supported portion 75 of the second arm portion 30 is located, a second outer circumferential portion 40c over which the second cam member 36 of the lateral opening mechanism 6 is located, and a third outer circumferential portion 40d which is inserted into the housing 80.

The first outer circumferential portion 40b is formed to have an outer circumferential surface having no concavity and convexity along the circumferential direction. Therefore, the second arm portion 30 located over the first outer circumferential portion 40b is rotatably supported along the circumferential direction of the second shaft member 40.

Meanwhile, each of the second outer circumferential portion 40c over which the second cam member 36 is located and the third outer circumferential portion 40d which is inserted into the housing 80 is formed into a polygonal shape, i.e., a plurality of portions of the outer circumferential portions 40c and 40d are cut off along a longer direction of the second shaft member 40 such that the outer circumference of radial cross sections of the outer circumferential portions 40c and 40d obtained by cutting the second shaft member 40 along the radial direction has a polygonal shape (or a D-shape).

As described later, a shaft insertion hole (a reference numeral 90 in FIG. 10) of the second cam member 36 provided to the second shaft member 40 is formed into a polygonal shape to fit the shape of the second outer circumferential portion 40c. Therefore, the second cam member 36 is fixedly provided to the second shaft member 40.

Figure 8:
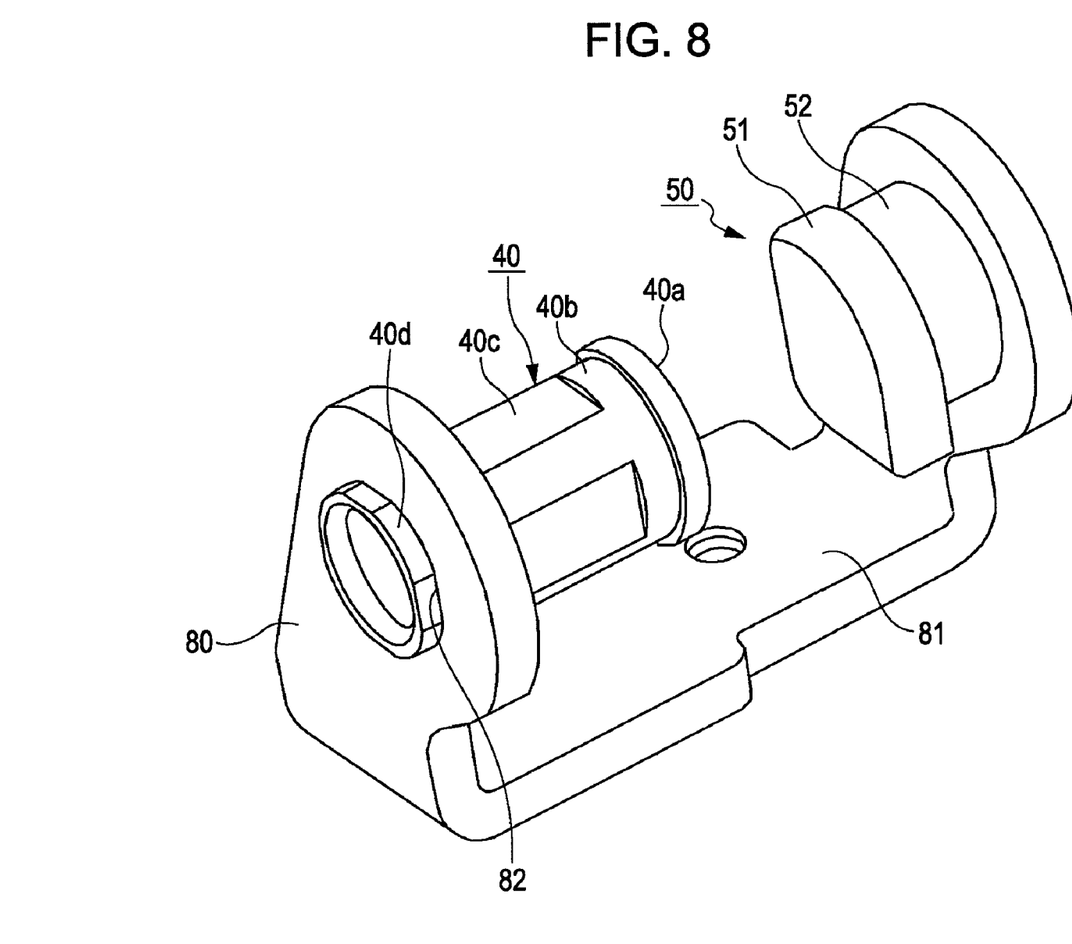
FIG. 8 is a perspective view of respective members forming a rotation axis for lateral opening of the biaxial hinge unit.

Further, as illustrated in FIG. 8, the second shaft member 40 is provided to the housing 80, with the third outer circumferential portion 40d inserted into a shaft insertion hole 82 of the housing 80. The shaft insertion hole 82 of the housing 80 is formed into a polygonal shape to fit the shape of the third outer circumferential portion 40d of the second shaft member 40. Therefore, the second shaft member 40 is fixedly (non-rotatably) provided to the housing 80.

Figure 9:
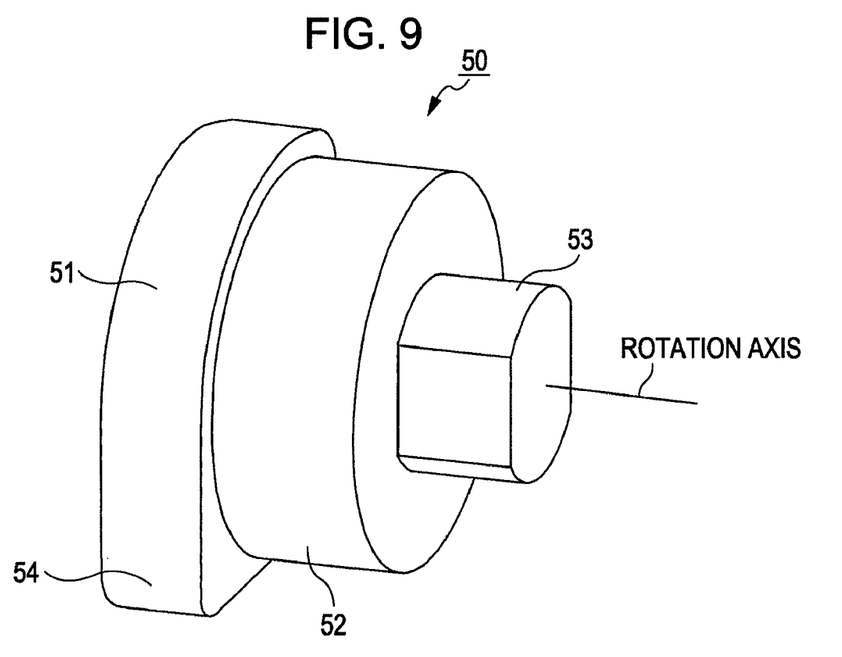
FIG. 9 is a perspective view of a third shaft member provided to the biaxial hinge unit.

The overall shape of the third shaft member 50 is formed by three disc members of a large diameter, a medium diameter, and a short diameter, respectively, which are substantially disc-shaped and coaxially-layered. The large-diameter disc member forms a stopper member 51 of the third shaft member 50, which includes a stopper projecting portion 54 projecting in a direction perpendicular to the direction of the rotation axis. Therefore, only the stopper member 51 has a teardrop shape. As described later, when the rotation angle formed between the upper case 1 and the lower case 2 reaches a predetermined rotation angle, e.g., 130 degrees, in the lateral opening operation of the mobile phone, the stopper projecting portion 54 of the stopper member 51 comes into contact with a stopper convex portion 38 of the second arm portion 30 illustrated in FIGS. 3 and 5. Thereby, the rotation angle formed between the upper case 1 and the lower case 2 is regulated to the predetermined rotation angle, e.g., 130 degrees.

Meanwhile, the medium-diameter disc member forms a rotation supporting portion 52 over which a second rotation supported portion 76 of the second arm portion 30 is located, and is formed to have an outer circumferential surface having no concavity and convexity along the circumferential direction. Therefore, the second arm portion 30 located over the rotation supporting portion 52 is rotatably supported along the circumferential direction of the third shaft member 50.

Further, as illustrated in FIG. 3 (and FIG. 5), the small-diameter disc member forms an insertion portion 53 inserted into a shaft insertion hole 83 of the housing 80. In the insertion portion 53, two mutually facing outer circumferential portions are cut off along the direction of the rotation axis such that a radial cross section of the insertion portion 53 has a polygonal shape. As described later, the shaft insertion hole 83 of the housing 80, into which the insertion portion 53 is inserted, has a polygonal shape fitting the insertion portion 53. With the insertion portion 53 of the third shaft member 50 inserted into the shaft insertion hole 83 of the housing 80, therefore, the third shaft member 50 is fixedly (non-rotatably) provided to the housing 80.

Figure 10:
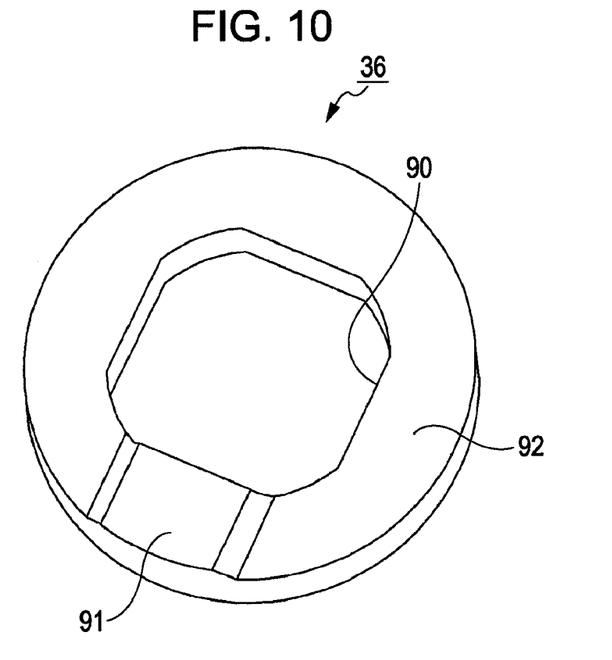
FIG. 10 is a perspective view of a second cam member provided to the biaxial hinge unit.

The second cam member 36, which is brought into contact with the cam surface 35 of the second arm portion 30 as illustrated in FIGS. 3 and 5, has a doughnut shape as illustrated in FIG. 10, and includes a shaft insertion hole 90 through which the second shaft member 40 is inserted, and a convex portion 91 which is provided to a cam surface 92. In the closed state of the mobile phone, the convex portion 91 fits in a first concave portion 45 provided in the cam surface 35 of the second arm portion 30 illustrated in FIG. 11. Further, when the rotation angle in the lateral opening operation reaches a preset predetermined rotation angle, e.g., 130 degrees, the convex portion 91 fits in a second concave portion 46 provided in the cam surface 35 of the second arm portion 30.

Further, respective end portions in the circumferential direction of the convex portion 91 are tapered to form gradual slopes from the cam surface 92 to the respective end portions of the convex portion 91. The disc springs 37 as illustrated in FIG. 5 bias the above-described second cam member 36 in the direction of the second arm portion 30.

Figure 11:
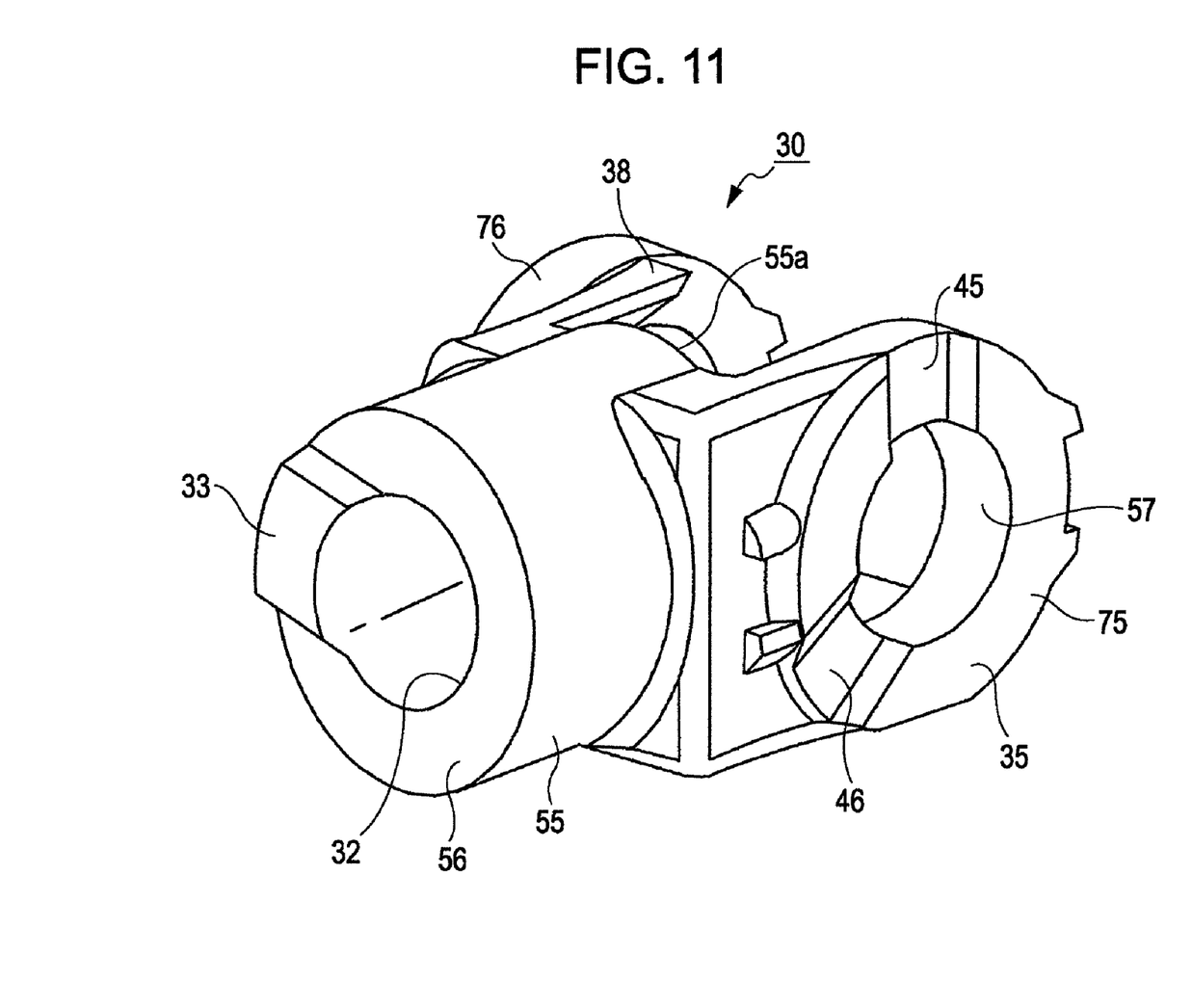
FIG. 11 is a perspective view of a second arm portion provided to the biaxial hinge unit.
Figure 12:
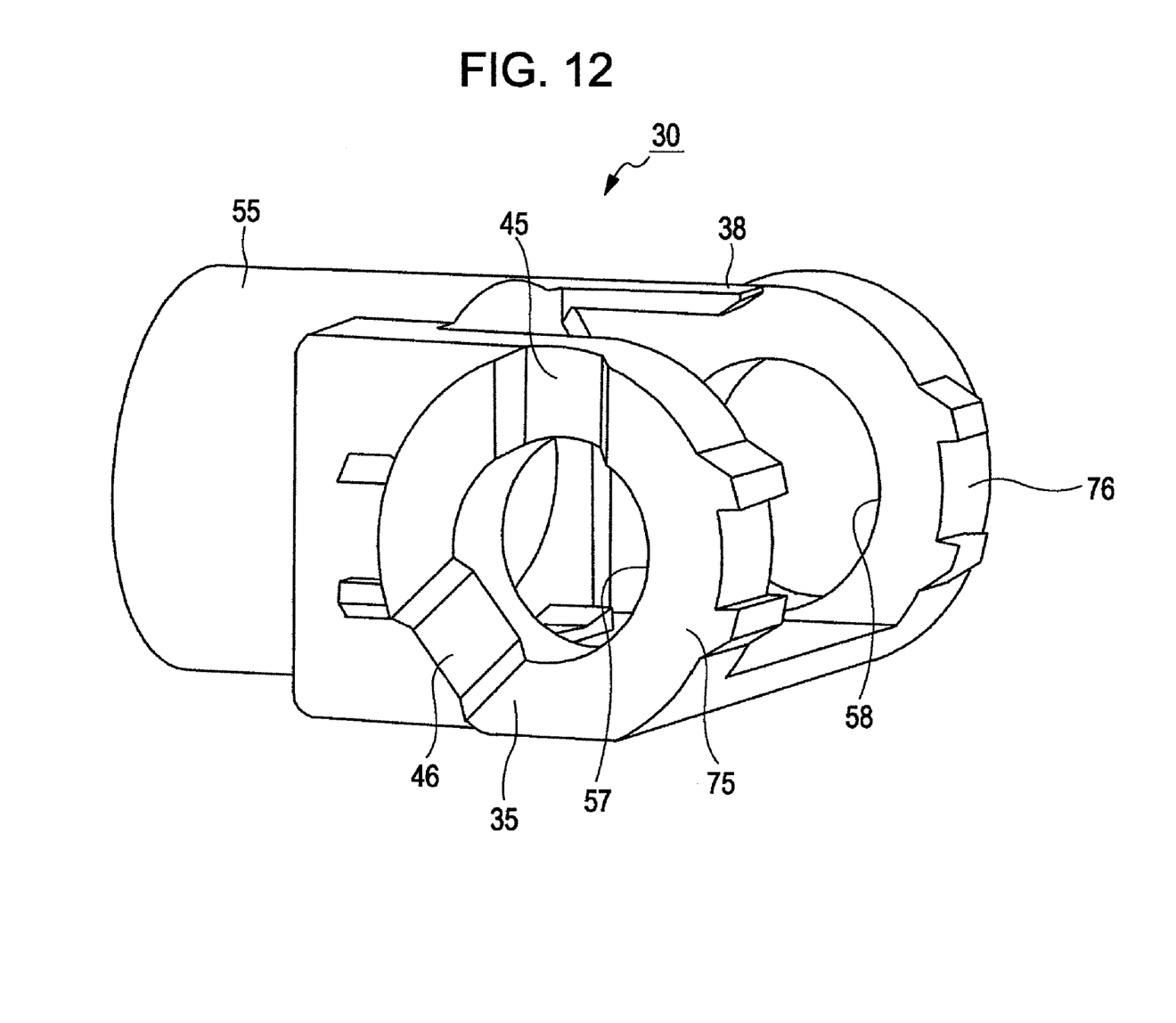
FIG. 12 is another perspective view of the second arm portion provided to the biaxial hinge unit.

Subsequently, FIG. 11 illustrates a perspective view of the second arm portion 30 as viewed from the side of the shaft insertion hole 32, and FIG. 12 illustrates a perspective view of the second arm portion 30 as viewed from the side of the first rotation supported portion 75. As seen from FIGS. 11 and 12, the second arm portion 30 has a shape in which the first rotation supported portion 75 and the second rotation supported portion 76 are connected to an outer circumferential portion near an other end portion 55a of a substantially cylindrically shaped shaft supporting portion 55 to face each other.

The shaft supporting portion 55 of the second arm portion 30 includes the shaft insertion hole 32, which extends along a longer direction of the shaft supporting portion 55 to be coaxial with the shaft supporting portion 55, and rotatably supports the first shaft member 11 inserted into the shaft insertion hole 32.

Further, one end portion of the shaft supporting portion 55 opposite to the other end portion 55a forms a cam surface 56 which comes into contact with the cam surface 72 of the first cam member 12 described with reference to FIG. 6. The cam surface 56 of the shaft supporting portion 55 is provided with the convex portion 33. As described above, the convex portion 33 fits in the concave portion 73 of the first cam member 12 in the closed state of the mobile phone, and fits in the concave portion 74 of the first cam member 12 when the rotation angle of the mobile phone in the longitudinal opening operation reaches a preset predetermined rotation angle, e.g., 170 degrees.

The first rotation supported portion 75 includes a shaft insertion hole 57 which extends along a direction perpendicular to the radial direction of the first rotation supported portion 75 to be coaxial with the first rotation supported portion 75. With the second shaft member 40 inserted into the shaft insertion hole 57, the second arm portion 30 is supported by the second shaft member 40 to be rotatable along the outer circumferential direction of the second shaft member 40.

Further, the cam surface 35 of the first rotation supported portion 75 is provided with the first concave portion 45 and the second concave portion 46. In the closed state of the mobile phone, the first concave portion 45 fits with the convex portion 91 of the second cam member 36, which has been described with reference to FIG. 10. When the rotation angle of the mobile phone in the lateral opening operation reaches a predetermined rotation angle, e.g., 130 degrees, the second concave portion 46 fits with the convex portion 91 of the second cam member 36.

Meanwhile, the second rotation supported portion 76 includes a shaft insertion hole 58 which extends along a direction perpendicular to the radial direction of the second rotation supported portion 76 to be coaxial with the second rotation supported portion 76. With the third shaft member 50 inserted into the shaft insertion hole 58, the second arm portion 30 is supported by the third shaft member 50 to be rotatable along the outer circumferential direction of the third shaft member 50.

Further, the second arm portion 30 is provided with the stopper convex portion 38 located at a position adjacent to the second rotation supported portion 76. The stopper convex portion 38 is formed by a projecting portion of the other end portion 55*a* of the shaft supporting portion 55. When the rotation angle of the mobile phone in the lateral opening operation reaches a predetermined rotation angle, e.g., 130 degrees, the stopper convex portion 38 comes into contact with the stopper projecting portion 54 of the third shaft member 50 illustrated in FIGS. 3 and 9. Thereby, the rotation angle in the lateral opening operation is regulated to the predetermined rotation angle, e.g., 130 degrees.

Opening and Closing Operations of Mobile Phone: Subsequently, description will be made of the opening and closing operations of the mobile phone of the present embodiment based on above-described biaxial hinge unit 3.

Longitudinal Opening Operation: Firstly, description will be made of the operation of the biaxial hinge unit 3 performed to bring the mobile phone into the longitudinally opened state illustrated in FIG. 1 from the closed state in which the upper case 1 and the lower case 2 are substantially superimposed on each other. In this case, a user holds the upper case 1 with the right hand and the lower case 2 with the left hand, and applies force to the upper case 1 by moving the right hand upward, for example. Thereby, the upper case 1 is rotated in the longitudinal direction (i.e., a longer direction of the cases 1 and 2), with the biaxial hinge unit 3 functioning as a rotation axis, and the mobile phone is brought into the longitudinally opened state illustrated in FIG. 1.

Herein, as illustrated in FIG. 1, the first arm portion 14 of the biaxial hinge unit 3 is screwed onto the upper case 1. Therefore, if the upper case 1 is rotated in the above-described manner, the first arm portion 14 is rotated in the longitudinal opening direction illustrated in FIG. 3. As described above, the first arm portion 14 is fixed to the first shaft member 11. Therefore, the first shaft member 11 is rotated in the longitudinal opening direction along with the rotation of the first arm portion 14.

The first shaft member 11 is provided with the first cam member 12 fixed thereto, which has been described with reference to FIG. 6. The first cam member 12 is biased by the spring 13 such that the cam surface 72 comes into contact with the cam surface 56 of the second arm portion 30 into which the first shaft member 11 is inserted.

In the closed state of the mobile phone, the concave portion 73 provided in the cam surface 72 of the first cam member 12 fits with the convex portion 33 provided to the cam surface 56 of the second arm portion 30. If the upper case 1 is rotated in the longitudinal opening direction, the first shaft member 11 is rotated in the longitudinal opening direction via the first arm portion 14. Along with this rotation, the first cam member 12 is rotated in the longitudinal opening direction, and the fitted engagement between the concave portion 73 of the first cam member 12 and the convex portion 33 of the second arm portion 30 is released.

Then, if the upper case 1 in the above-described state is further rotated in the longitudinal opening direction, and if the angle formed between the upper case 1 and the lower case 2 reaches approximately 170 degrees, for example, the concave portion 74 formed in the cam surface 72 of the first cam member 12 fits with the convex portion 33 provided to the cam surface 56 of the second arm portion 30. Thereby, the angle formed between the upper case 1 and the lower case 2 is regulated to approximately 170 degrees, for example, and the mobile phone is brought into the longitudinally opened state illustrated in FIG. 1.

The first cam member 12 is applied with biasing force by the spring 13. Therefore, when the angle formed between the upper case 1 and the lower case 2 reaches the approximately 170 degrees and the concave portion 74 and the convex portion 33 fit with each other again, a so-called click sound is produced. With the click sound, the user recognizes that the mobile phone has been brought into the longitudinally opened state.

If the upper case 1 is rotated to bring the mobile phone back to the closed state from the longitudinally opened state, the fitted engagement between the concave portion 74 of the first cam member 12 and the convex portion 33 of the second arm portion 30 in the longitudinally opened state is released. Then, when the mobile phone is brought into the closed state, the concave portion 73 of the first cam member 12 and the convex portion 33 of the second arm portion 30 fit with each other again.

Herein, if the angle formed between the upper case 1 and the lower case 2 in the longitudinal opening operation reaches approximately 170 degrees, for example, the projecting portion 24 provided to the rotation regulating member 20 of the first shaft member 11 moves to a position substantially adjacent to the stopper 31 provided to the second arm portion 30. Then, if the user attempts to perform an opening operation to have the longitudinal angle formed between the upper case 1 and the lower case 2 exceed the 170 degrees, the projecting portion 24 provided to the rotation regulating member 20 comes into contact with the stopper 31 of the second arm portion 30 illustrated in FIG. 13, to thereby regulate the longitudinal opening operation performed by the user. Accordingly, the longitudinal angle formed between the upper case 1 and the lower case 2 can be regulated to approximately 170 degrees plus 1 to 3 degrees. It is therefore possible to prevent inconvenience of damage to the mobile phone caused by the forcible longitudinal opening operation performed by the user.

Lateral Opening Operation: Subsequently, description will be made of the operation of the biaxial hinge unit 3 performed to bring the mobile phone into the laterally opened state illustrated in FIG. 2 from the closed state in which the upper case 1 and the lower case 2 are substantially superimposed on each other. In this case, a user holds the upper case 1 with the right hand and the lower case 2 with the left hand, and applies force to the upper case 1 and the lower case 2 in a manner in which a book is opened, for example. Thereby, the upper case 1 is rotated in the lateral opening direction (i.e., a shorter direction of the cases 1 and 2), with the biaxial hinge unit 3 functioning as a rotation axis, and the mobile phone is brought into the laterally opened state illustrated in FIG. 2.

Herein, as illustrated in FIG. 2, the second arm portion 30 is screwed onto the lower case 2 via the housing 80. Further, the first shaft member 11 provided with the first arm portion 14 fixed to the upper case 1 is inserted into the shaft insertion hole 32 of the second arm portion 30. Therefore, if the upper case 1 is rotated in the lateral opening direction in the above-described manner, the second arm portion 30 is rotated in the lateral opening direction illustrated in FIG. 3. As described with reference to FIG. 11, due to the biasing action of the disc springs 37 as illustrated in FIG. 5, the cam surface 35 of the second arm portion 30 is in contact with the cam surface 92 of the second cam member 36 fixedly provided to the second shaft member 40.

In the closed state of the mobile phone, the convex portion 91 provided to the cam surface 92 of the second cam member 36 fits in the first concave portion 45 provided in the cam surface 35 of the second arm portion 30. If the upper case 1 is rotated in the lateral opening direction and thus the second arm portion 30 is rotated in the lateral opening direction, the fitted engagement between the convex portion 91 of the second cam member 36 and the first concave portion 45 of the second arm portion 30 is released.

Then, if the upper case 1 in the above-described state is further rotated in the lateral opening direction and the angle formed between the upper case 1 and the lower case 2 reaches approximately 130 degrees, for example, the convex portion 91 provided to the cam surface 92 of the second cam member 36 fits in the second concave portion 46 provided in the cam surface 35 of the second arm portion 30. Thereby, the angle formed between the upper case 1 and the lower case 2 is regulated to approximately 130 degrees, for example, and the mobile phone is brought into the laterally opened state illustrated in FIG. 2.

The second cam member 36 is applied with the biasing force by the disc springs 37. Therefore, when the angle formed between the upper case 1 and the lower case 2 reaches the approximately 130 degrees and the convex portion 91 fits in the second concave portion 46, a so-called click sound is produced. With the click sound, the user recognizes that the mobile phone has been brought into the laterally opened state.

If the upper case 1 is rotated to bring the mobile phone back to the closed state from the laterally opened state, the fitted engagement between the convex portion 91 and the second concave portion 46 in the laterally opened state is released. Then, when the mobile phone is brought into the closed state, the convex portion 91 and the first concave portion 45 fit with each other again.

Herein, when the lateral angle formed between the upper case 1 and the lower case 2 in the lateral opening operation reaches approximately 130 degrees, for example, the stopper convex portion 38 provided to the second arm portion 30 as illustrated in FIGS. 11 and 12 moves to a position substantially adjacent to the stopper projecting portion 54 of the third shaft member 50 illustrated in FIGS. 3, 5, and 9. Then, if the user attempts to perform an opening operation to have the lateral angle formed between the upper case 1 and the lower case 2 exceed the 130 degrees, the stopper convex portion 38 provided to the second arm portion 30 comes into contact with the stopper projecting portion 54 of the third shaft member 50, to thereby regulate the opening operation performed by the user. Accordingly, the lateral angle formed between the upper case 1 and the lower case 2 can be regulated to approximately 130 degrees plus 1 to 3 degrees. It is therefore possible to prevent inconvenience of damage to the mobile phone caused by the forcible lateral opening operation performed by the user.

Regulation of Longitudinal Opening Operation in Laterally Opened State: Meanwhile, if the lateral angle formed between the upper case 1 and the lower case 2 has reached approximately 130 degrees and the mobile phone has been brought into the laterally opened state as described above, the rotation regulating member 20 of the first shaft member 11 enters into the gap 60 illustrated in FIGS. 3 and 5, which is formed between the end portion 40a of the second shaft member 40 and the end portion 50a of the third shaft member 50. Thereby, the longitudinal opening operation in the laterally opened state is regulated.

Specifically, as described with reference to FIG. 4, the right and left end portions of the rotation regulating member 20 are cut off along the thickness direction. That is, the right and left end portions of the rotation regulating member 20 are cut off along the thickness direction such that the width of the rotation regulating member 20 is substantially equal to the width of the gap 60 illustrated in FIGS. 3 and 5, which is formed between the end portion 40a of the second shaft member 40 and the end portion 50a of the third shaft member 50.

The respective surface portions obtained by the cutting-off form the first contact surface portion 22 and the second contact surface portion 23. In the laterally opened state of the mobile phone, the first contact surface portion 22 comes into contact with the end portion 40a of the second shaft member 40 illustrated in FIG. 5. Further, in the laterally opened state of the mobile phone, the second contact surface portion 23 comes into contact with the end portion 50a of the third shaft member 50 illustrated in FIG. 5.

That is, in the laterally opened state of the mobile phone, the rotation regulating member 20 of the first shaft member 11 is sandwiched and held by the end portion 40a of the second shaft member 40 and the end portion 50a of the third shaft member 50. Therefore, even if the longitudinal opening operation of the mobile phone is attempted in the laterally opened state of the mobile phone, the rotation of the first shaft member 11 is regulated via the rotation regulating member 20, with the end portion 40a of the second shaft member 40 or the end portion 50a of the third shaft member 50 acting as a wall. Accordingly, it is possible to regulate the longitudinal opening operation in the laterally opened state of the mobile phone.

Configuration for Inserting Cable: In the above-described biaxial hinge unit 3 enabling the longitudinal opening and the lateral opening of the cases 1 and 2, a cable 100, a flexible board, or the like can be wired through the cable insertion hole 21 of the cylindrically shaped first shaft member 11 and the cable insertion hole 41 of the cylindrically shaped second shaft member 40, as illustrated in FIG. 3.

Specifically, as described with reference to FIG. 4, the first shaft member 11 includes the cable insertion hole 21 passing therethrough in the extending direction thereof. Similarly, the second shaft member 40 includes the cable insertion hole 41 passing therethrough in the extending direction thereof.

In the mobile phone of the present embodiment, therefore, an electrical component such as a display unit provided to the upper case 1 and an electrical component such as a circuit board provided to the lower case 2, for example, are electrically connected to each other by the cable 100 wired through the cable insertion hole 21 provided in the first shaft member 11 and the cable insertion hole 41 provided in the second shaft member 40. Therefore, both in the longitudinal opening operation and the lateral opening operation performed by the user, it is possible to prevent inconvenience of twisting of the cable 100, and thus to prevent inconvenience such as cutting-off of the cable 100 resulting from the twisting caused by the respective operations.

Further, due to the wiring of the cable 100 through the cable insertion hole 21 provided in the first shaft member 11 and the cable insertion hole 41 provided in the second shaft member 40, a cable wiring space can be eliminated from the biaxial hinge unit 3. Due to the elimination of the cable wiring space, therefore, the biaxial hinge unit 3 can be reduced in size.

Effects of Embodiment: As is clear from the foregoing description, in the mobile phone of the present embodiment, the substantially cylindrically shaped second shaft member 40 is fixedly provided to the housing 80 fixed to the lower case 2, to thereby form the rotation axis for the lateral opening operation. Further, the second arm portion 30, which includes the shaft insertion hole 32 formed to extend in a direction perpendicular to the rotation axis for the lateral opening operation formed by the second shaft member 40, is provided to the second shaft member 40 to be rotatable along the outer circumferential direction of the second shaft member 40.

Further, the substantially cylindrically shaped first shaft member 11 is rotatably inserted into the shaft insertion hole 32 of the second arm portion 30, to thereby form the rotation axis for the longitudinal opening operation. Further, the first arm portion 14 fixed to the upper case 1 is fixedly provided to the first shaft member 11.

Further, the cable 100 (or the flexible board or the like) for electrically connecting an electrical component of the upper case 1 to an electrical component of the lower case 2 is wired through the cable insertion hole 21 provided along the longer direction of the substantially cylindrically shaped first shaft member 11 to be coaxial with the first shaft member 11 and through the cable insertion hole 41 provided along the longer direction of the substantially cylindrically shaped second shaft member 40 to be coaxial with the second shaft member 40.

With the above-described configuration, both in the longitudinal opening operation and the lateral opening operation performed by the user, it is possible to prevent inconvenience of twisting of the cable 100, and thus to prevent inconvenience such as cutting-off of the cable 100 resulting from the twisting caused by the respective operations.

Further, due to the wiring of the cable 100 through the cable insertion hole 21 provided in the first shaft member 11 and the cable insertion hole 41 provided in the second shaft member 40, a cable wiring space can be eliminated from the biaxial hinge unit 3. Due to the elimination of the cable wiring space, therefore, the biaxial hinge unit 3 can be reduced in size.

Further, in the mobile phone of the present embodiment, the disc springs 37 are used to bias the second cam member 36 for regulating the rotation angle formed between the upper case 1 and the lower case 2 in the lateral opening operation (see FIG. 5). Therefore, as compared with a configuration using a spring as a biasing member, the present embodiment can substantially reduce the space occupied by the biasing member. Due to the substantial reduction of the space occupied by the biasing member, therefore, the biaxial hinge unit 3 can be reduced in size.

In the above-described embodiment, the spring 13 is used to bias the first cam member 12 for regulating the rotation angle formed between the upper case 1 and the lower case 2 in the longitudinal opening operation. Alternatively, a plurality of superimposed disc springs may be used in place of the spring 13. With this configuration, the space occupied by the spring 13 can also be substantially reduced. Accordingly, the biaxial hinge unit 3 can be further reduced in size.

Further, due to the above-described reduction in size of the biaxial hinge unit 3, it is possible to prevent inconvenience of radio interference caused by a large-sized hinge device substantially projecting from the cases.

Modified Example: In the description of the above embodiment, the present invention is applied to a mobile phone. Alternatively, the present invention may also be applied to another device, such as a PHS (Personal Handyphone System) phone, a PDA (Personal Digital Assistant) device, a mobile game device, a digital camera device, and a notebook personal computer device. In any of the cases, similar effects to the above-described effects can be obtained.

Lastly, the above-described embodiment is one example of the present invention. It is needless to say, therefore, that the present invention is not limited to the above-described embodiment and thus can be modified in a variety of ways in accordance with the design and so forth within a scope not departing from the technical concept of the present invention.

What is claimed is:

1. A biaxial hinge device having mutually substantially perpendicular rotation axes for connecting a first case and a second case so as to be longitudinally and laterally openable comprising:
   a first rotation axis mechanism configured to form a first rotation axis by using a substantially cylindrically shaped first shaft member;
   a first arm portion configured to include a fixing portion fixed to a first case, and provided to the first shaft member of the first rotation axis mechanism;
   a second rotation axis mechanism configured to include a fixing portion fixed to a second case, and to form a second rotation axis substantially perpendicular to the first rotation axis by using a substantially cylindrically shaped second shaft member;
   a second arm portion configured to connect the first rotation axis mechanism to the second rotation axis mechanism such that the first rotation axis mechanism is rotatable around the second rotation axis of the second rotation axis mechanism;
   a first cam member configured to come into contact with the second arm portion to regulate the rotational position of the first arm portion;
   first biasing means for biasing the first cam member such that the first cam member comes into contact with the second arm portion;
   a second cam member configured to come into contact with the second arm portion to regulate the rotational position of the second arm portion; and
   second biasing means for biasing the second cam member such that the second cam member comes into contact with the second arm portion.

2. The biaxial hinge device according to claim 1, wherein a cable or a flexible board can be wired through a hole of the substantially cylindrically shaped first shaft member and a hole of the substantially cylindrically shaped second shaft member.

3. The biaxial hinge device according to claim 1, wherein at least the second biasing means includes a disc spring.

4. A mobile terminal device in which a first case and a second case are connected to each other to be longitudinally and laterally openable via a biaxial hinge device having mutually substantially perpendicular rotation axes, the biaxial hinge device comprising:
   a first rotation axis mechanism configured to form a first rotation axis by using a substantially cylindrically shaped first shaft member;
   a first arm portion configured to include a fixing portion fixed to the first case, and provided to the first shaft member of the first rotation axis mechanism;
   a second rotation axis mechanism configured to include a fixing portion fixed to the second case, and to form a second rotation axis substantially perpendicular to the first rotation axis by using a substantially cylindrically shaped second shaft member; and
   a second arm portion configured to connect the first rotation axis mechanism to the second rotation axis mechanism such that the first rotation axis mechanism is rotatable around the second rotation axis of the second rotation axis mechanism;

a first cam member configured to come into contact with the second arm portion to regulate the rotational position of the first arm portion;

first biasing means for biasing the first cam member such that the first cam member comes into contact with the second arm portion;

a second cam member configured to come into contact with the second arm portion to regulate the rotational position of the second arm portion; and second biasing means for biasing the second cam member such that the second cam member comes into contact with the second arm portion.

* * * * *